No. 817,512. PATENTED APR. 10, 1906.
W. S. PALMER.
MINER'S PICK.
APPLICATION FILED DEC. 18, 1905.
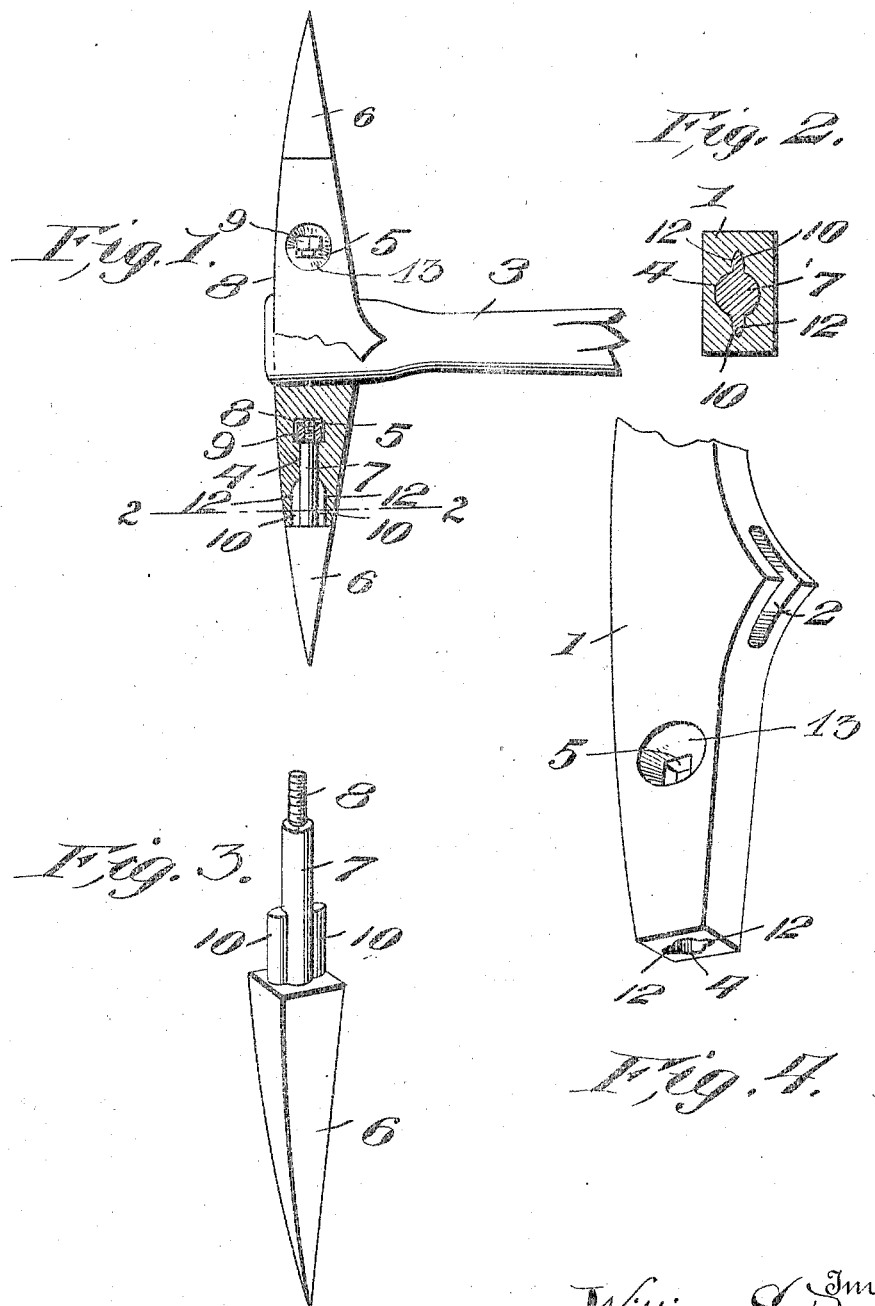

UNITED STATES PATENT OFFICE.

WILLIAM S. PALMER, OF BLAIRSVILLE, PENNSYLVANIA.

MINER'S PICK.

No. 817,512.  Specification of Letters Patent.  Patented April 10, 1906.

Application filed December 18, 1905. Serial No. 292,311.

*To all whom it may concern:*

Be it known that I, WILLIAM S. PALMER, a citizen of the United States, residing at Blairsville, in the county of Indiana and State of Pennsylvania, have invented certain new and useful Improvements in Miners' Picks; and I do declare the following to be a full, clear, and exact description of the invention, such as will enable others skilled in the art to which it appertains to make and use the same.

This invention relates to improvements in miners' picks.

The object of the invention is to provide a pick of this character having removable points and means whereby said points are secured in place on the head of the pick.

A further object is to provide a fastening device for the removable point which may be operated without the use of tools to secure the point in place or to remove the same.

With the above and other objects in view the invention consists of certain novel features of construction, combination, and arrangement of parts, as will be hereinafter described and claimed.

In the accompanying drawings, Figure 1 is a side elevation, partly in section, of a pick constructed in accordance with the invention. Fig. 2 is a transverse sectional view taken on the line 2 2 of Fig. 1. Fig. 3 is a detail perspective view of one of the removable points, and Fig. 4 is a similar view of one end of the pick-head.

Referring more particularly to the drawings, 1 denotes the head of the pick, which is provided with a centrally-disposed eye 2 for the reception of a handle 3. In the opposite ends of the head 1 are formed longitudinally-disposed bores 4, which extend inwardly from said ends and communicate with or intersect transversely-disposed openings 5, formed through the pick-head, as shown.

Adapted to be secured on the ends of the head 1 are detachable points 6, each of which is provided with a reduced stem 7, which is adapted to be inserted into the bores 4. On the inner ends of the stems 7 are formed reduced threaded shanks 8, which are adapted to project into the openings 5 and which have engaged therewith nuts 9, which when screwed upon said shanks will securely hold the points in place on the head. The stems 7 are provided adjacent to their connections with the points 6 with radially-disposed flanges or wings 10, which when the points are in place are adapted to engage similarly-disposed grooves or recesses 12, formed in the walls of the bores 4, in the ends of the pick-head. The arrangement of the flanges or wings 10 will prevent the point of the pick from turning in the head, while the nuts 9 will securely hold said points in place.

The transversely-disposed openings 5 are preferably rectangular in shape, and the outer ends of the same are reamed or flared outwardly, as shown at 13, to form enlarged recesses, whereby the nuts may be readily engaged by the fingers and applied to the threaded shanks of the pick-points without the use of tools, thus enabling the points to be quickly removed from or attached to the pick-heads.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

A miner's pick comprising a head provided with a longitudinal bore in the opposite ends thereof, said bore having grooves at opposite sides thereof and provided with a transverse opening 5 intersecting the terminal end of said bore, a detachable point having a reduced stem to enter said bore, and radial flanges to engage said grooves, a reduced threaded shank to project into said transverse opening, and a thumb-nut mounted upon the threaded shank of the stem, substantially as described.

In testimony whereof I have hereunto set my hand in presence of two subscribing witnesses.

WILLIAM S. PALMER.

Witnesses:
 GEORGE W. HART,
 JACOB G. GEIB.